United States Patent
Holl (10) Patent No.: US 7,125,527 B2
(45) Date of Patent: Oct. 24, 2006

(54) METHODS OF OPERATING SURFACE REACTORS AND REACTORS EMPLOYING SUCH METHODS (75) Inventor: Richard A. Holl, Camarillo, CA (US)

(73) Assignee: KinetiChem, Inc., Camarillo, CA (US)

( * ) Notice: Subject to any disclaimer, the term of this patent is extended or adjusted under 35 U.S.C. 154(b) by 278 days.

(21) Appl. No.: 10/656,627

(22) Filed: Sep. 5, 2003

(65) Prior Publication Data
US 2005/0053532 A1 Mar. 10, 2005

(51) Int. Cl.
B01J 8/08 (2006.01)
B01D 47/16 (2006.01)
B01F 3/04 (2006.01)

(52) U.S. Cl. .................. 422/209; 422/224; 261/86; 261/89

(58) Field of Classification Search ............... 422/135, 422/138, 186, 186.3, 224, 129, 209, 100; 261/86, 89
See application file for complete search history.

(56) References Cited

U.S. PATENT DOCUMENTS

| 3,902,857 | A | * | 9/1975 | Vander Mey et al. | ......... | 422/198 |
| 4,549,998 | A | * | 10/1985 | Porter et al. | ................ | 261/88 |
| 4,627,803 | A | * | 12/1986 | Umetsu | .................. | 425/6 |
| 6,482,960 | B1 | * | 11/2002 | Brechtelsbauer et al. | ... | 549/332 |
| 6,858,189 | B1 | * | 2/2005 | Ramshaw et al. | ........... | 422/186 |
| 2003/0161767 | A1 | * | 8/2003 | Ramshaw et al. | ...... | 422/186.29 |
| 2004/0236039 | A1 | * | 11/2004 | Jachuck | ...................... | 526/62 |
| 2004/0241430 | A1 | * | 12/2004 | Jachuck et al. | ............. | 428/330 |
| 2005/0158220 | A1 | * | 7/2005 | Ramshaw et al. | .......... | 422/186 |

FOREIGN PATENT DOCUMENTS

| EP | 1 464 389 | * | 10/2004 |
| EP | 0499362 | * | 10/2004 |
| GB | 2108407 | * | 5/1983 |

* cited by examiner

Primary Examiner—N. Bhat (57) ABSTRACT

Methods of operating surface reactors, and such reactors, particularly spinning disc reactors require that a first reactant is fed to the reactor surface and forms a thin film on the surface. A second reactant is fed to the surface in the form of a second thin film to interact with the first film so as to overcome the impedance to interaction between the two films imposed by the existence of molecular clusters in the films. Thus, each film is fed into the receiving film at a rate such as to break up the molecular clusters in the film and thereby permit the molecules to aggressively and completely interact with one another. In the spinning disc apparatus the films are fed at respective distances from the spin axis. The interaction takes place in a thin chamber (less than 1 mm) between a retaining surface coextensive with the reactor surface whose distance from one another can be varied continuously, with the components being sheared between the surfaces to break up the molecular clusters to facilitate molecular, forced interdiffusion. Preferably each film is fed into the reaction chamber through a respective annular nozzle producing an improved uniformity of initial and continuous contacting of the reactants followed by an increase in forced interdiffusion of reactant molecules.

20 Claims, 6 Drawing Sheets

METHODS OF OPERATING SURFACE REACTORS AND REACTORS EMPLOYING SUCH METHODS

FIELD OF THE INVENTION

The invention is concerned with new methods of operating surface reactors, and with new reactors employing such methods, and especially but not exclusively to methods and reactors employing the so-called spinning disc technology.

BACKGROUND OF THE INVENTION

Chemical reactions cannot occur until individual molecules of the reagents are brought together, and physical interactions between components are greatly facilitated as the components are more and more intimately mixed together. Bulk stirring is only able to present the opportunity for reagent molecules to contact one another after sufficient time has elapsed to provide the necessary uniformity of interdispersion of the reagents' molecules for achieving the desired one on one contact which finally makes a reaction possible, and only molecular diffusion can accomplish the required one on one contact, which is a very slow process. These encounters can be helped to occur by establishing small scale fluid structures or eddies within which molecular diffusion becomes significant. The role of the reactor, and the mixing and mass transfer equipment associated with it, is to create these small scale fluid structures in order to generate and improve mixing, mass transfer and molecular inter-diffusion. The reactor equipment must therefore direct energy into the fluid system in the correct way. In a stirred tank reactor (STR) the energy input clearly comes from the impeller, but this arrangement suffers from high energy losses through friction, macro-agitation, mere recirculation of the fluid, and other factors. The energy which is usefully employed is focused mainly upon the fluid in contact with the impeller, particularly with its leading edges, along which occurs the only action which can be called forced, molecular inter-diffusion. This means that while the power input at the impellor tip may be very high (e.g. 1000 W/kg) the majority of the fluid is not undergoing forced molecular inter-diffusion, and the average power input across the whole tank producing conversion is low (e.g. 0.1–1 W/kg).

A further important disadvantage of bulk agitated chemical reaction systems is the fact that dimensional scaling up or down also changes the kind and quality of the resultant product. Very often, time consuming trial and error experimentation is required after a change in vessel dimensions. It may take as many as 5 years for some reactions to be scaled up from test tube to a fully undustrial sized apparatus. This handicap is a consequence of the changing ratio of wet volume to wetted surface areas when dimensional changes of the apparatus are made which will change the corresponding hydraulic radius and in turn the resulting Reynolds number of the agitated fluid. The larger the ratio of wet volume to wetted surface becomes the more difficult the scaling up. For this reason, chemical engineers have been trying to move into the other direction and by raising the wetted surface to wet volume ratio and compensate the lost economy of large scale by improving the intensity of bulk agitation.

The typical advances that have been obtained in improved mass transfer are by use of what is known as high-power, rotor-stator mixers, where the proportion of the fluid volume in contact with the rotor surface is much lower, and by use of static mixers and ejectors where the large amount of energy which can be supplied by pumps goes into the whole of the fluid hold-up volume through intensified supra-Kolmogoroff agitation. In this way higher power inputs (e.g. 100W/kg) can be created, followed by improved mass transfer. However, such apparatus suffer from the inability to effect continuous, high-speed, uniform and forced inter-diffusion of reactant molecules on a sub-micron and nanometer scale in addition to the inadequate thermal control available, for example, with highly exotherm, fast reactions. Another type of apparatus that has been employed comprises static micro mixers, which can produce mixtures of liquids and gases, as well as generate multiphase dispersions. Such devices, which can be manufactured using methods borrowed from the electronics industry, consist of a series of very small channels engraved or etched, for example, into a silicon wafer surface, through which the reaction components are passed together in laminar flow mode; the channels can for example be as small as 10 micrometers in diameter. The mixing mechanism is based on flow multilamination with subsequent interdiffusion of molecules between the overlapping fluid lamellae. When used as a reactor the reduction of the diffusional path length results in accelerated mass and heat transfer. Despite the improved mass transfer obtainable with the above mentioned equipment, many reactions are very slow because they are still diffusion controlled and therefore their rate depends on slow, natural, unforced, molecular inter-diffusion.

There is therefore increasing interest in what has been referred to as process intensification technology, fueled primarily by the need to provide industrial processes that are more efficient and economical than those employed to date. Such technology is applied to any physical and/or chemical process involving heat and/or mass transfer and/or physical and/or chemical reaction, the latter term including both chemical composition and decomposition, and it generally involves producing on, and/or introducing to, a moving surface a thin film or its equivalent (see below) of each of the process components, so that interaction between them is greatly facilitated. It is also found that such interactions are possible under conditions of temperature and/or pressure that can be relatively closely controlled. When a process component has the form of a gas, or a vapor, or a plasma, it may be introduced to the surface in a form which is equivalent to a thin film, for example by bathing the surface in the component, or as a flow of the required thin dimension.

One way in which process intensification technology has been implemented is known as Spinning Disc technology, in which a body providing a disc-like surface, which may be flat or conical, is rotated about a spin axis to create centrifugal force across the surface. The process components are introduced on to the disc surface at or adjacent to the spin axis, whereby the component(s) flow radially outward under the centrifugal force in the form of a thin film. Such apparatus was proposed initially for typical heat and mass transfer operations, and subsequently has been adapted for use as a reacting surface. The employment of the process component(s) in the form of very thin films also facilitates the application to the material(s) of different types of energy that will assist in promoting the process intensification, such as electromagnetic radiation or longitudinal pressure oscillations. Examples of such spinning disc apparatus, and their methods of operation, are described in U.S. Pat. No. 4,549,998 and PCT applications Nos. PCT/GB00/00519; PCT/GB00/00521; PCT/GB00/00523 and PCT/GB01/00634, all in the names of Colin RAMSHAW et al.

Professor Colin Ramshaw and others of the Process Intensification and Innovation Centre (PIIC) at Newcastle University, England have developed processes and apparatus for continuous production of nano particles from various reactions using thin, highly sheared films on the top surface of a single rotating disk, usually now referred to as a Spinning Disc Reactor (SDR). Unsteady film surface waves on the disc surface, coupled with the shearing action of the rotating surface, ensure that micro mixing is achieved. These films are less than 100 microns thick and so offer a short diffusion path length, resulting in excellent heat and mass transfer. Residence times on the SDR range from a few seconds down to fractions of a second, and it is therefore well suited to fast processes where the inherent reaction kinetics are of the same order or faster than the mixing kinetics.

An evaluation of spinning disk reactor technology for the manufacture of pharmaceuticals was published in Industrial & Engineering Chemistry Research 2000, Vol 39, Issue 7, pp 2175–2182 by Brechtelsbauer C.; Ricard F.; Lewis N.; Oxley P.; and Ramshaw C. A continuously operating SDR displayed distinct advantages over batch processing techniques when several processes for the manufacture of pharmaceuticals were investigated as test reactions. It proved to be a useful tool for revealing intrinsically fast kinetics as well as for optimizing processes with such kinetics. Very encouraging results were achieved for a phase-transfer-catalyzed (ptc) Darzen's reaction to prepare a drug intermediate and the recrystallization of an active pharmaceutical ingredient (API). In comparison to presently used batch processes the ptc reaction with the SDR had a 99.9% reduced reaction time, 99% reduced inventory, and 93% reduced impurity level. The recrystallization yielded particles with a tight particle size distribution and a mean size of around 3 μm.

An evaluation of an SDR for continuous processing was published in Organic Process Research & Development 2001, Vol 5, Issue 1, pp 65–68, again by Brechtelsbauer C.; Ricard F.; Lewis N.; Oxley P.; and Ramshaw C. The results obtained for two organic reactions and one crystallization are discussed. The SDR was found to be a useful tool for revealing intrinsically fast kinetics as well as for optimizing a process with such kinetics. Control of particle size distribution was demonstrated with the crystallization investigated.

An evaluation of the use of an SDR in the application of electromagnetic radiation to chemical processes was given in a paper entitled Photo-initiated Polymerization Using A Spinning Disc Reactor by Dalglish, R.; Jachuck, A and Ramshaw, C. of the Process Intensification & Innovation Centre (PIIC), Newcastle University, England, presented at a conference entitled Process Intensification in the Chemical Industry, Antwerp, Netherlands, 25th Oct., 1999. The results of photo initiated polymerization studies carried out at PIIC using a spinning disc reactor are discussed. Initial results have been promising and suggest a novel route for fast, controlled and continuous polymerization of free radicals. The effect of UV intensity, film thickness of the monomer/polymer film and the rotational speed in the rate of polymerization has been studied. It is hoped that this technique may be used to perform polymerization reactions in seconds rather than hours.

SUMMARY OF THE INVENTION

It is an object of this invention to provide new methods of operating rotating surface reactors and reactors employing such methods facilitating fast and high rate conversion chemical reactions involving liquid-liquid, solute-liquid, liquid-solid, solute-solid, liquid-gas and solute-gas reactions.

It is another object to provide such methods and apparatus in which it becomes possible to achieve a maximum number of simultaneous encounters of a maximum number of reactant/solute molecules for the purpose of creating products from the molecules.

It is a further object to provide such methods and apparatus in which it becomes possible to achieve a maximum number of simultaneous encounters of reactant/solute molecules with one another while having assumed mutual spatial positions in which reaction will occur.

In accordance with the invention there are provided methods of operating surface reactors comprising the steps of:

providing a reactor body having a reactor surface;

feeding a first reactant to the reactor surface at a first entry location and at a rate such that the reactant spreads out on the surface from the entry location in the form of a first thin film;

feeding a second reactant to the reactor surface at a second entry location and into the first film in the form of a second thin film in order to interact with the first film; and collecting the resultant product of the first and second films at the periphery of the surface Also in accordance with the invention there is provided a surface reactor comprising:

a reactor body having a reactor surface;

means for feeding a first reactant to the reactor surface at a first entry location and at a rate such that the reactant spreads out on the surface from the entry location in the form of a first thin film;

means for feeding a second reactant to the reactor surface at a second entry location and into the first film in the form of a second thin film in order to interact with the first film; and means for collecting the resultant product of the first and second films at the periphery of the surface.

The second film may be fed into the first film at a first distance from the first entry location, and a third film of a third reactant fed into the film formed by the mixture of the first and second reactants at a third entry location a second distance from the first entry location.

The reactor surface may be provided by a rotor mounted on a support body and spun about a rotation axis; wherein the reactor surface extends radially from the rotation axis; and wherein the films move radially on the reactor surface under pumping pressure of the feed pumps and centrifugal force provided by the spinning of the rotor. Preferably the reactor surface is polished to a glass-like smoothness.

Each film may be fed into the respective film that receives it so as to overcome the impedance to interaction between the two films imposed by the existence of molecular clusters in the films. Moreover, each film may be fed into the respective film that receives it at a flow-rate and shear-rate such as to break up the molecular clusters in the film to which it is fed and thereby permit the molecules of the films to aggressively and completely bond with one another to form a resultant product.

Preferably each film is fed into the respective film that receives it through a respective circular venturi nozzle producing an increase in the velocity of the film for its shearing encounter with the corresponding film.

Preferably a retaining surface is provided coextensive with the reactor surface and passage of the films takes place in a gap formed between the reactor and retaining surfaces. The thickness dimension of the gap may be varied during operation and may be adjusted to less than 1.00 mm (0.04 in), and preferably is less than 0.5 mm (0.02 in). The retaining surface may be provided with heat exchange means to heat or cool the reactants passing in the gap.

DESCRIPTION OF THE DRAWINGS

Methods and apparatus that are particular preferred embodiments of the invention will now be described, by way of example, with reference to the accompanying diagrammatic drawings, wherein.

DESCRIPTION OF THE INVENTION

The apparatus is mounted on a base member 10 and in this embodiment comprising a rotor given the general reference 12 that is mounted on the base member for rotation about a vertical axis 14 by means of a bearing support 16. The rotor comprises a disc portion 18 having a flat circular upper reactor surface 20 with the axis 14 as its center or generation and rotation, the disc portion being mounted on the upper end of a frusto-conical connecting portion 22 of decreasing diameter downward. The connecting portion is in turn mounted on a cylindrical shaft portion 24 of uniform diameter along its length, this shaft portion being engaged in a bearing (not shown) carried by the bearing support 16. The lower end of the shaft portion carries a V-groove pulley 26 connected by a drive belt 28 to a similar pulley 30 mounted on drive shaft 32 of a controllable speed drive motor 34 mounted on the base member 10. If preferred, or in addition, the pulleys 26 and 30 and the drive belt 28 can be replaced by a pulley assembly of known kind that will enable the speed of rotation of the rotor to be adjusted to a required value.

Figure 1:
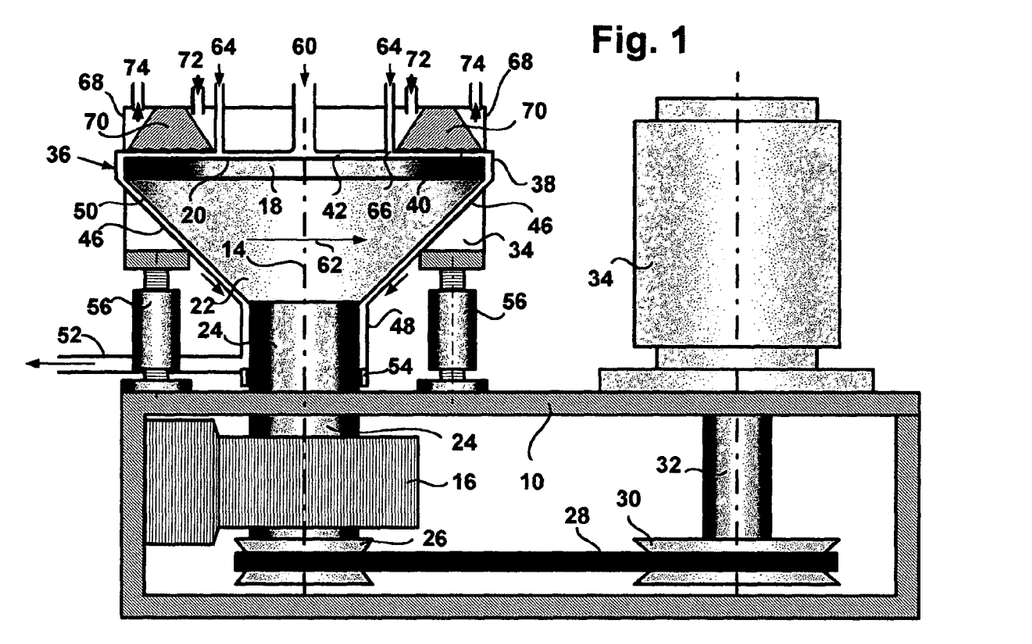
FIG. 1 is a part side elevation, part cross section through a vertical longitudinal axis, of a first embodiment of apparatus of the invention, comprising a spinning disc reactor, in order to illustrate the principal construction features of such an apparatus.

The part of the rotor above the base is surrounded by a stator comprising an enclosing casing given the general reference 36, the shape of the casing conforming to that of the reactor surface 20, the circumferential surfaces of the disc portion and connecting portion 22, and the part of the shaft portion 24 above the base member. Thus, the stator casing has a circular part 38 parallel to the disc portion 18, this part having a circular inner surface 40 close to, facing, and parallel to the disc surface 20 to provide a corresponding circular, pancake shaped chamber 42 of uniform vertical dimension between the surfaces 20 and 40; the vertical cylindrical side of the chamber is open and constitutes an outlet therefrom. The casing also has an upper uniform diameter cylindrical part 44 surrounding the disc portion 18, a connecting frusto-conical part 46 surrounding the connecting part 22, and a lower cylindrical part 48 surrounding the corresponding part of the shaft portion 24. The narrow space between the rotor outer surface and the stator casing inner surface constitutes a flow passage 50 of corresponding shape leading from the chamber outlet to an outlet 52, the annular gap between parts 24 and 48 being closed by a shaft seal 54. The stator casing is supported from the base member 10 by a plurality (only two seen in FIG. 1) of circumferentially spaced precision turnbuckles 56 that enable the axial dimension 58 (see FIG. 2) of the chamber 42 to be set to any desired value, which in this embodiment is about 1 mm (0.04 in) or less, and preferably is 0.5 mm (0.02 in) or less.

A first reactant is fed via a precision metering pump (not shown) and an inlet tube 60 on to the rotor reactor surface 20 at its center point. The rotor is rotating in the direction of the arrow 62 at a predetermined speed of rotation, typically in the range of 100 to 10000 rpm, and the resultant centrifugal force immediately spreads the reactant over the surface 20 in the form of a thin film that is moved radially outwards through the chamber 42 towards the flow passage 50. A second reactant is also fed via a precision metering pump (also not shown) to an inlet 64 spaced radially outward a predetermined distance from the rotor center and together with the first reactant completely fills the chamber. This inlet 64 has the form of an annulus so that the reactant is delivered to the reactor surface in the form of a thin annular film impinging on to and mixing immediately and uniformly with the existing radial moving film of the first reactant at a circular location indicated by the reference 66. The outlet from the annular inlet takes the form of a radially outward curved annular venturi that converts the flow into an even faster radially outward moving film so that very high rates of mixing can be achieved within a very short radial distance from the circle of impingement. For example, it is possible to achieve such uniform mixing within a period of less than 5 milliseconds during which the mixing reagents have moved a radial distance of less than 5 mm (0.2 in). Thereafter, the already uniformly interspersed reactants are subjected to intense, forced, molecular inter-diffusion caused by the high shear rates obtained by the high speed rotation of reactor surface 20 on one side of the flow against the stationary parallel surface 40 on the other side. As indicated above, these surfaces may be very closely spaced apart by only a fraction of a millimeter, for example 250 μm. Typical shear rates obtainable at such a gap size are between 10,000 and 100,000 sec$^{-1}$. It is important that the parallel spacing of the shearing surfaces permits only highly sheared, thin films whereas such that no tank-like macro-agitation can make possible, as will be described in greater detail below. The fact that high speed, uniform, forced, molecular inter-diffusion of the reactant fluid molecules takes place can be verified by examining various chemical reactions performed in the reactor, which are found to occur over 100 to 1,000 times faster than in a conventional stirred tank.

Figure 2:
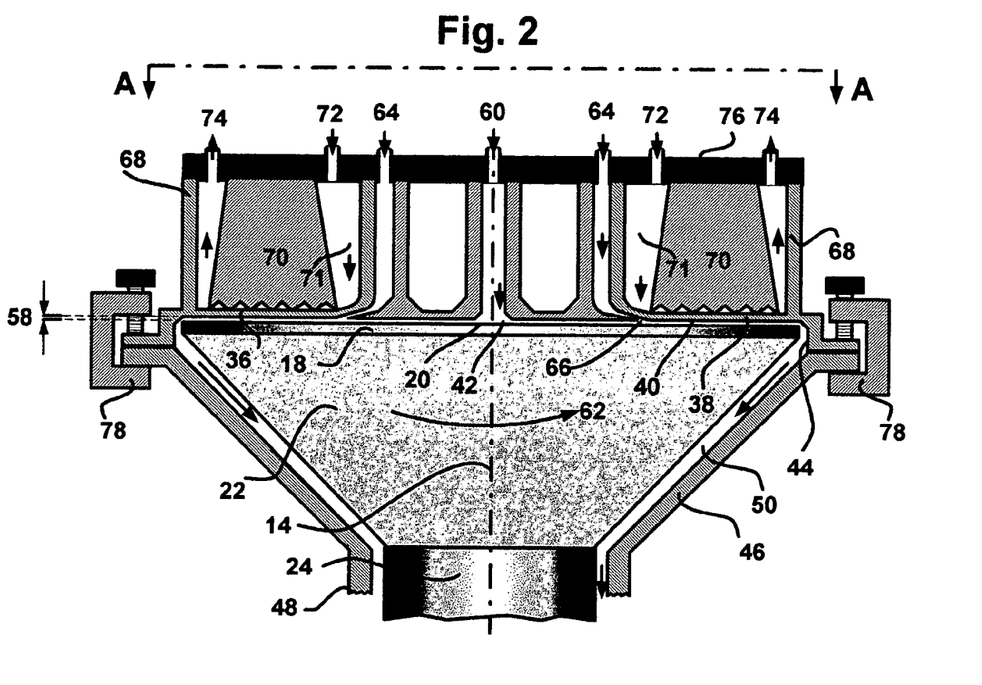
FIG. 2 is a cross section, as with the part cross section of FIG. 1, to a larger scale, of a second embodiment, and in order to show a reactor portion of the apparatus in greater detail, the reactor having provision for entry of two reaction components thereto.
Figure 3:
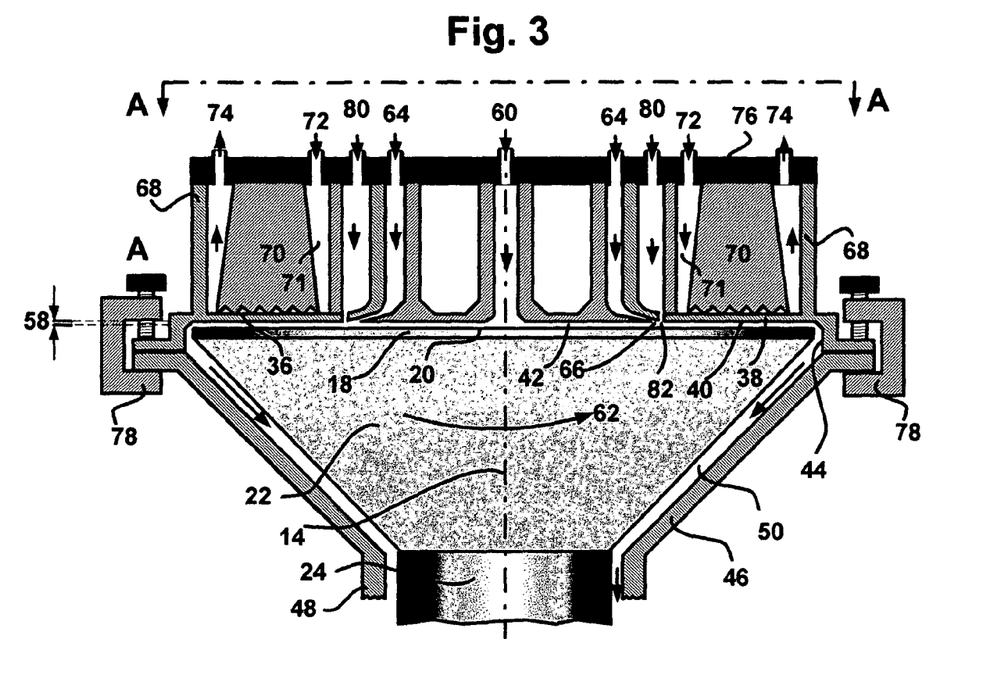
FIG. 3 is a cross section similar to FIG. 2, and of a further embodiment, wherein the reactor has provision for entry of three reaction components thereto.
Figure 4:
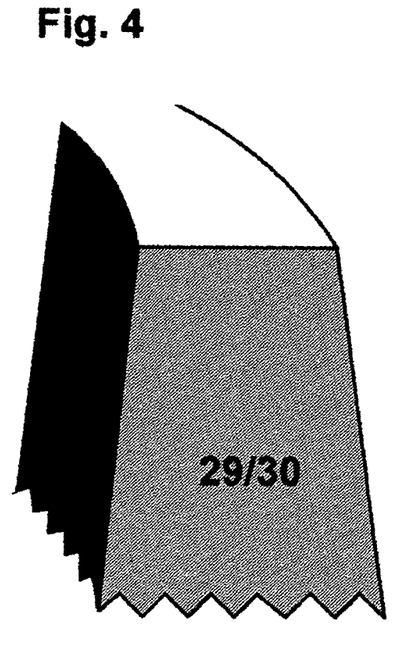
FIG. 4 is a side elevation of a part of the reactor structure employed to enhance heat transfer to and from any reaction taking place in the reactor.
Figure 5:
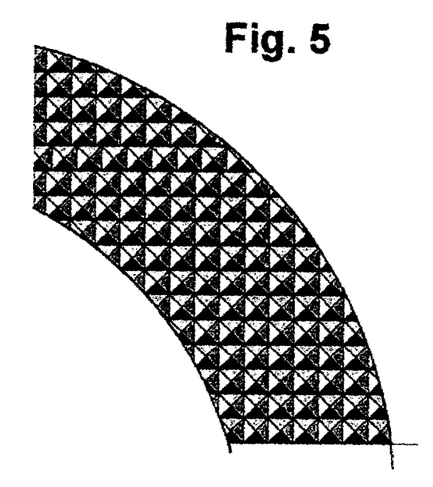
FIG. 5 is a bottom elevation taken in the direction of the line C—C in FIG. 4.
Figure 6:
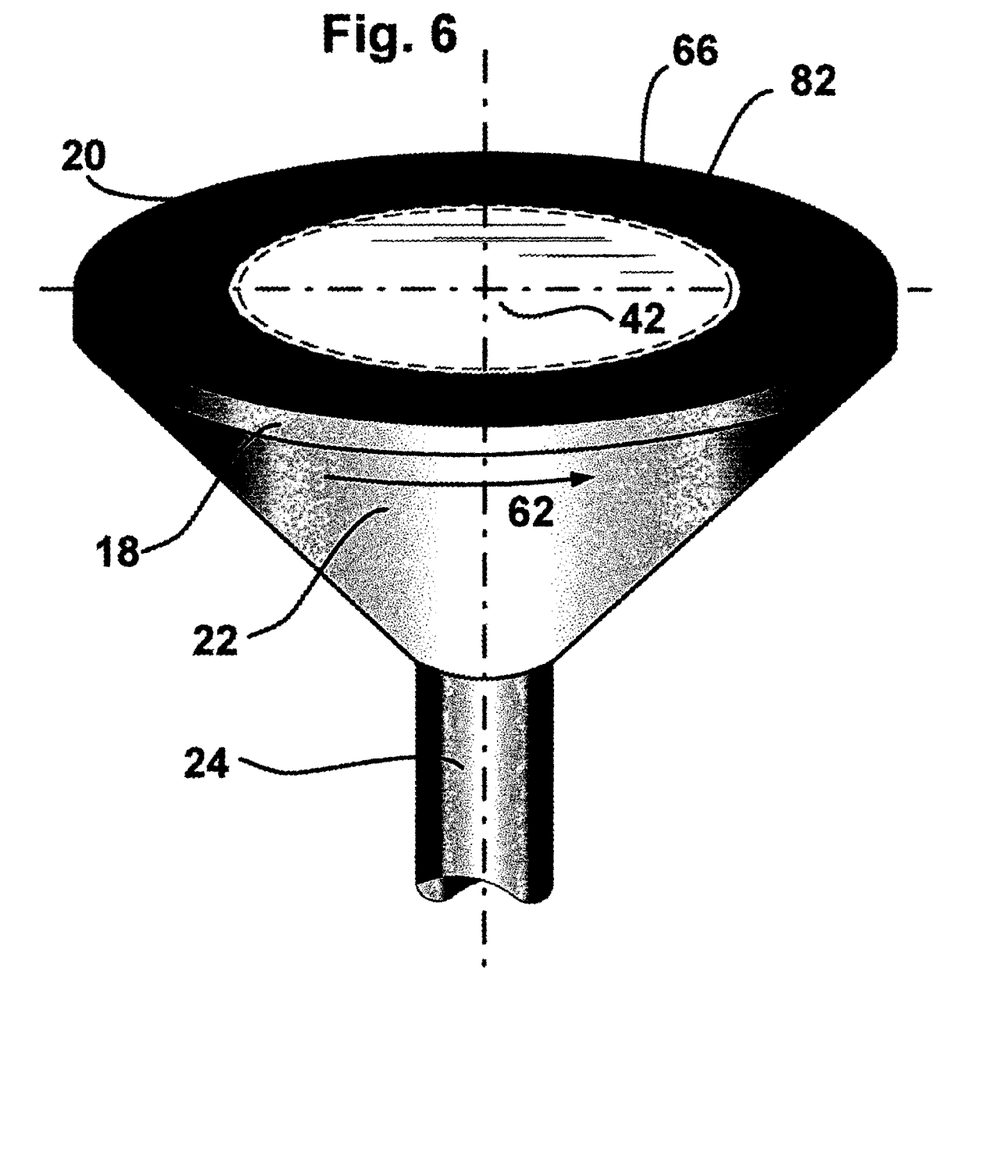
FIG. 6 is an isometric view of a reactor part providing the spinning disc as employed in the apparatus of FIG. 2.
Figure 7:
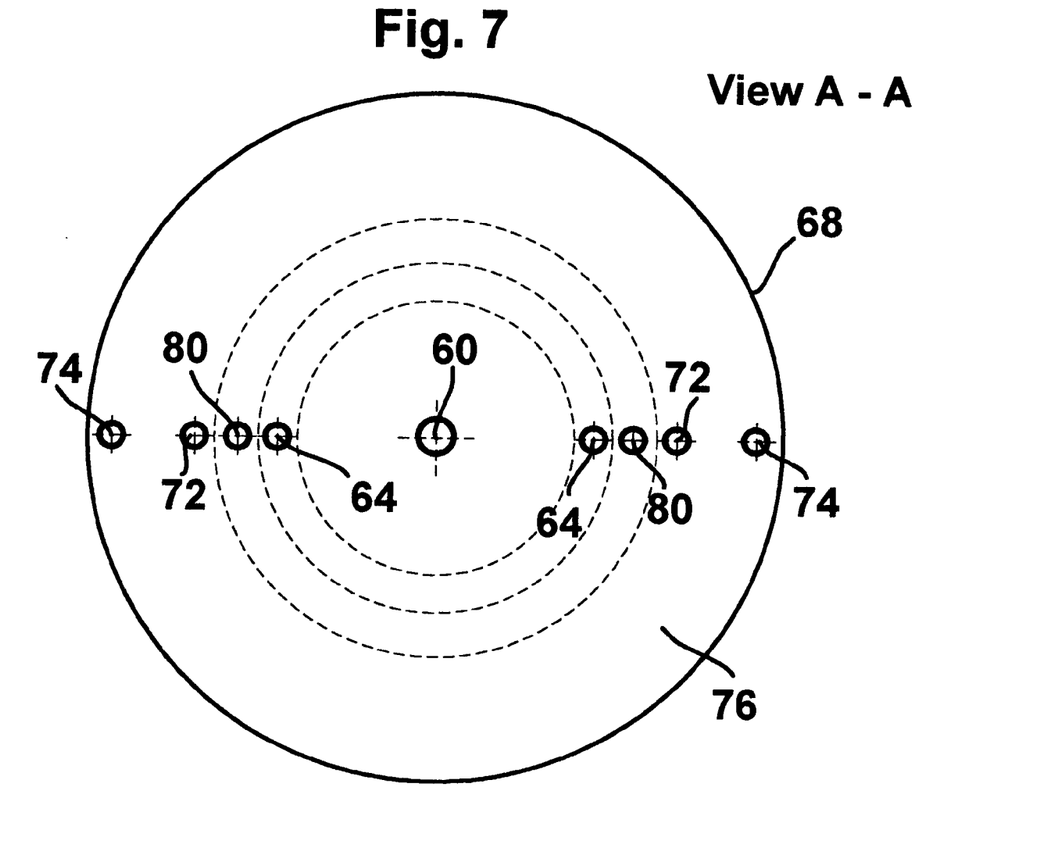
FIG. 7 is top view of the inlet connections to the reactor enclosure.

After having passed through the high shear, washer-like, thin space in the chamber 42 the resultant product, which may be a liquid, a suspension of fine solids in a liquid, or a gas mixed with a liquid, exits from the chamber, turns around the edge of the spinning disk, and passes through the flow passage 50 to exit through outlet port 52. It is important to provide very accurate temperature control of the reactants before they enter the reaction zone and also while the reaction/s are under way in the reaction zone. The reactants may be preheated or precooled, (not illustrated in the drawings), as required, before they enter the reactor and the temperature required for the optimum reaction performance is maintained, at least in the annular reaction zone between the circular inlet 64 for the second reactant and the outlet from the chamber, by heat transfer means provided in the stator 36. In this embodiment such heat transfer means consist of an annular chamber 68 containing an annular heat transfer augmentation body 70, the lower surface of which is in contact with the upper surface of the stator circular part 38 and is knurled (see FIGS. 4 and 5) to provide a multitude of interconnected heat transfer augmentation channels through which heat transfer fluid is caused to flow in passing from an inlet 72 into the chamber 71 to an outlet 74 therefrom. The need for a heat transfer system for the spinning reactor surface 20 can usually be avoided by making the disc and connecting portions 18 and 22 respectively of thermally insulating material; however, such a system can be provided by the provision of suitable passages and connecting tubes, as is known to those skilled in the art of making heatable screws for injection molding equipment. The reactor surface 20 preferably is highly polished to a glass-like smoothness, The stator superstructure, consisting of feed tubes, temperature control system, etc. is held firmly and dimensionally stably together by the top plate 76 which, as seen in FIGS. 2 and 3, is of relatively considerable thickness, and provides structural strength and, buckling resistance against internal pressures. The resultant circular and annular wall structures forming the inlets and heat transfer means may be fastened to this top plate to form one rigid structure, as seen in FIGS. 2 and 3, which when clamped, as for example by clamps 78. to the frusto-conical casing part 46, provides the pancake or washer shaped reaction chamber 42.

It is vitally important in designing processes for the interaction of fluids, and apparatus wherein such processes are to take place, to understand as fully as possible the "mechanics" of the interactions, and this becomes even more important when such interactions are chemical reactions that will result in new products. The following is presented as my understanding to date of the mechanics of this invention, although I do not intend the scope of the invention to be limited in any way by this presentation. As described above, the prior methods of achieving high mass transfer and especially accelerated chemical reaction kinetics, generally suffer from the inability to effect continuous, high-speed, uniform and forced inter-diffusion of reactant molecules on a sub-micron and nanometer scale. Despite the improved mass transfer that can be obtained with this prior equipment, many reactions are still diffusion controlled and therefore their rate depends on slow, natural, "non-forced," molecular inter-diffusion. In addition, it is believed that achievement of fast inter-diffusion is hampered significantly by the diffusion retarding preponderance of what may be termed molecular clusters or swarms, inherently occurring in liquids or gases, within which clusters or swarms the molecules are anisotropically ordered from a kinematics point of view. Such ordering impedes rapid, natural interdiffusion due to the oscillation mode of the molecules within the clusters or swarms, consisting of large numbers of molecules oscillating in unison and unidirectionally on a scale <100 nm.

It is known that liquids and gases, when not in motion or subject to bulk, random, macro-agitation, tend to form what has been variously referred to in the literature as molecular clusters, or cybotactic regions, or molecular domains, or molecular swarms, or pseudo-compounds, hereinafter for convenience in description referred to as molecular clusters, unless quoting from some pertinent publication. When these clustered liquids or gases are forced to flow at high speed through very narrow, unidirectional and uniform shearfields, e.g. between closely spaced, parallel flat and solid surfaces as with the surfaces 20 and 40 of the apparatus of this invention, the molecular clusters break up and greatly facilitate un-clustered, individual reactant molecules to encounter each other on a one on one basis and thereby permit very rapid and efficient reactions to take place.

In a publication entitled Kinetic Theory of Liquids, published by Oxford University Press, First Edition 1946, p304, the author Jacob Frenkel refers to these clusters as molecular "swarms." According to Frenkel, these swarms usually have linear dimensions of the order of <100 nm, while the orientation of the molecules within the same swarm can gradually change from point to point, which must obviously correspond to an additional "elastic" energy. In a transition from one swarm to the next, the orientation of the molecules must change more or less sharply, in correspondence with a rotation of their axes, often by an angle of the order of 90 degrees. The corresponding additional energy can be treated as the surface energy of the swarms, since it is proportional to the area of contact between them. In the case of anisotropic liquids, in the absence of external influences, the swarms maintain a practically constant structure, as is apparent from the permanence of the picture observed through a polarization microscope. Hence according to Frenkel it follows that the swarms have in this case an 'athermic' origin, i.e. they do not represent thermodynamically stable groupings, arising spontaneously as a result of thermal fluctuations, and in this respect they are similar to the crystallites of an ordinary solid body. The splitting up of a simple organic liquid, such as molten paraffin, into a large number of 'micro-swarms' (which must not be confused with micro-crystals because of the kinematical peculiarity of their rotations and deformations) is not due to extraneous causes and must arise as a result of the tendency of the molecules to be arranged in an energetically most advantageous way, i.e. in a tight contact with each other, in spite of the thermal agitation, which tends to distribute them in an absolutely irregular manner."

This phenomenon is easily seen under an ultra-microscope. The enormously large number of liquid molecules that surround, for example, very small, nanometer size particles and cause them to move erratically in all directions (Brownian motion), can be viewed as molecular clusters containing in their center embedded, submicron particles. During the short, single straight paths between changes in direction, half of the molecules of the surrounding cluster move in a "foward" direction, while the other half retreat in the opposite direction in unison, making Brownian motion possible and even visible. Again, the number of molecules participating in these unison, orchestrated motions, are huge, otherwise they would be unable to so quickly accelerate and decelerate a suspended particle with its relatively large mass and inertia. Their combined mass is capable of pushing, accelerating and decelerating solid particles, such as fine pigment particles of sizes up to 1.5 micrometers along paths of considerable length, for example up to 800 nanometers. The frequency of these erratic and quirky movements increases as the cluster's size, and that of the embedded particle they surround, decreases. After hypothetically removing the particles from the liquid the clusters must remain along with their vibrational frequencies. These orchestrated cluster motions are simultaneously and correspondingly associated with an equal number of compensating counter motions of other clusters and their molecules, even with clusters formed by chemically different liquids. In an ideal reaction, not just the surface molecules of reactant clusters react, slowly removing layer after layer of molecules from the cluster bodies, but all reactant molecules meet one on one as quickly as possible and in proper orientation to one another. But in the real world of chemical reaction engineering, time consuming mass transfer through agitation after many minutes, hours and days, finally may produce a near uniform distribution of interspersed molecular clusters of the reactants. Thereafter and finally, the slow process of molecular diffusion from the interior of the clusters to their surface makes it possible for individual molecules to react with one another to form new product molecules with their own clusters or are interspersed between the molecules of reactant clusters.

The problem to be solved by the present invention is to reduce the time required for uniform mixing of two or more reactants to a few milliseconds, and thereafter to forcibly inter-diffuse the molecules contained in the reactants' clusters nearly instantaneously to allow a very rapid encounter of all reactant molecules as simultaneously as possible, thus allowing chemical kinetics to be used and explored without being masked and blanketed by issues of mass transfer. According to Frenkel the molecular clusters are generated by the superposition of hypersonic, longitudinal pressure waves which permeate liquids in all directions and cause the formation of interference patterns complete with pressure/density nodes and antinodes whose position fluctuates continuously in accordance with the changing beat frequencies caused by the superposed wave trains crisscrossing the liquid body. In turn, the longitudinal pressure waves originate in the translational, angular and rotational oscillations of the individual molecules. This theory of the formation, origin and kinematics of molecular clusters or swarms has been experimentally simulated and demonstrated on a large scale model by elastically bonding together a larger number of metallic, spiral springs into a large panel, representing liquid molecules in a plane, and making them oscillate. It was possible to observe a continuously changing kaleidoscope of spring clusters, forming constantly changing shapes and oscillatory directions of coherent groups of springs. There was no display of chaotic, mutually independent movements or oscillations of individual spring elements, which would have represented the mechanism of natural molecular diffusion as described classically. This simulation therefore demonstrates a possible origin of the formation and existence of molecular "swarms" or "clusters" and the opposition they render to the diffusional independence of single oscillating elements (representing single molecules), necessary for high yield and rapid chemical reactions. The problem is solved therefore, as is described above, by providing methods and apparatus in which these molecular clusters are broken up and their molecules re-aligned.

The apparatus of FIG. 3 is essentially similar to that of FIG. 2, except that provision is made to feed a third reactant into the reaction chamber 42, This third reactant is also fed via a precision metering pump (also not shown) to an inlet 80 spaced radially outward a predetermined distance from the rotor center and from the inlet 64 for the second reactant. This inlet 80 also has the form of an annulus so that the reactant is delivered to the reactor surface in the form of a thin annular film impinging on to and mixing immediately and uniformly with the existing radial moving film of the mixture of the first and second reactants at a circular location indicated by the reference 82.

INDEX OF REFERENCE NUMERALS

10. Apparatus base
12. Rotor
14. Rotor axis
16. Bearing support for rotor bearing
18. Rotor disc portion
20. Circular upper surface of disc portion
22. Rotor frusto-conical connecting portion
24. Rotor cylindrical shaft portion
26. Pulley on shaft portion 24
28. Drive belt
30. Pulley on drive motor shaft
32. Motor drive shaft
34. Drive motor
36. Stator general reference
38. Rotor casing circular part
40. Circular inner surface of part 38
42. Pancake shaped chamber between surfaces 20 and 40
44. Upper cylindrical casing part around disc portion 18
46. Frusto-conical casing part around connecting portion 22
48. Lower cylindrical casing part around shaft portion 24
50. Flow passage between rotor and stator
52. Outlet from passage 50
54. Rotating seal between shaft portion 24 and casing part 48
56. Turnbuckles connecting base 10 and stator casing 36
58. Axial dimension of chamber 42
60. Inlet for first reactant
62. Arrow indicating rotor direction of rotation
64. Inlet for second reactant
66. Circle of impingement of second reactant on first film
68. Annular stator heat transfer chamber
70. Heat transfer augmentation body
72. Inlet to heat transfer chamber 68
74. Outlet from heat transfer chamber 68
76. Stator top plate
78. Holding clamps
80. Inlet for third reactant
82. Circle of impingement of third reactant on existing film

I claim:

1. Methods of operating surface reactors comprising in each method the steps of:
    providing a reactor body having a reactor surface;
    feeding a first reactant to the reactor surface from a first entry location so that the reactant spreads out on the reactor surface in the form of a first thin film;
    feeding a second reactant to the reactor surface from a second entry location so that the reactants can interact in a reaction zone on the reaction surface; and
    collecting the product of the interacting reagents at an outlet location;
    wherein the reactor body provides a retaining surface closely spaced from the reactor surface so as to form between them a reaction passage providing a reaction zone between the second entry location and the outlet location and through which the reactants fed to the reactor surface will pass while reacting with one another, the reactor and retaining surfaces being movable relative to one another to apply shear between them to reactants passing in the reaction passage; and
    wherein each reactant after the first is fed to the reactor surface in the form of a respective thin film that is fed into a respective preceding thin film or combination of thin films, each thin film at its entry to the reaction passage immediately being subjected at its intersection with the preceding thin film or combination of thin films to continuous and uniform shear, the shear rate being such as to disrupt molecular clusters in the thin films and thereby permit the molecules of the thin films to aggressively react with one another to form the resultant product.

2. A method as claimed in claim 1, wherein the reactor surface is a surface of a disk spinning about a rotation axis; and wherein shear in the reaction passage is transverse to the direction of the flow of reactants in the passage and is produced by relative rotation between the moving reaction surface and the retaining surface which is stationary.

3. A method as claimed in claim 2, wherein each thin film after the first thin film is fed to that thin film or to a subsequent mixture of thin films at an entry location spaced at a radial distance from the rotation axis such as to provide the shear required to ensure disruption of molecular clusters in the reacting reactants.

4. A method as claimed in claim 2, wherein the thickness of each of the thin films is between 5 and 500 micrometers.

5. A method as claimed in claim 2, wherein the thickness dimension of the reaction chamber can be varied and is less than 1.00 mm (0.04 in).

6. A method as claimed in claim 2, wherein each thin film after the first thin film is fed vertically to the reactor surface into the first thin film or combination of thin films that precedes it.

7. A method as claimed in claim 2, wherein each thin film is fed into the thin film that receives it through a respective annular nozzle producing a respective thin film directed at the reactor surface.

8. A method as claimed in claim 1, wherein the thickness of each of the thin films is between 5 and 500 micrometers.

9. A method as claimed in claim 1, wherein the thickness dimension of the reaction chamber can be varied and is less than 1.00 mm (0.04 in).

10. A method as claimed in claim 1, wherein each thin film after the first thin film is fed vertically to the reactor surface into the first thin film or combination of thin films that precedes it.

11. A method as claimed in claim 1, wherein the shear in the interacting reactants is increased by introduction of a pressurized gaseous component into the reaction passage.

12. A surface reactor comprising:
a reactor body having a reactor surface;
means for feeding a first reactant to the reactor surface from a first entry location so that the reactant spreads out on the reactor surface in the form of a first thin film;
means for feeding a second reactant to the reactor surface from a second entry location so that the reactants can interact in a reaction zone on the reactor surface with the first film; and
means for collecting the product of the interacting reactants at an outlet location;
wherein the reactor body provides a retaining surface closely spaced from the reactor surface so as to form between them a reaction passage providing a reaction zone between the second entry location and the outlet location and through which the reactants fed to the reactor surface will pass while reacting with one another, the surfaces being movable relative to one another to apply shear between them to reactants passing in the reaction passage; and wherein each reactant after the first reactant is fed to the reactor surface in the form of a respective thin film that is fed into a respective preceding thin film or combination of thin films, each thin film at its entry to the reaction passage immediately being subjected at its intersection with the preceding thin film or combination of thin films to continuous and uniform shear therein, the shear rate being such as to disrupt molecular clusters in the thin films and thereby permit the molecules of the thin films to aggressively react bond with one another to form the resultant product.

13. A surface reactor as claimed in claim 12, wherein the reactor surface is a surface of a disk spinning about a rotation axis; and wherein shear in the reaction passage is transverse to the direction of the flow of reactants in the passage and is produced by relative rotation between the moving reaction surface and the retaining surface which is stationary.

14. A surface reactor as claimed in claim 13, wherein at each entry location the respective reactant is fed in the form of a thin film of thickness between 5 and 500 micrometers.

15. A surface reactor as claimed in claim 13, wherein the reactor comprises means whereby the thickness dimension of the reaction passage can be varied, and the thickness dimension is less than 1.00 mm (0.04 in).

16. A surface reactor as claimed in claim 13, wherein the means feeding each thin film after the first thin film to the reactor surface is fed vertically to the reactor surface into the first thin film or combination of thin films that precedes it.

17. A surface reactor as claimed in claim 13, wherein each thin film after the first film is fed into the film that receives it through a respective annular nozzle producing a respective thin film directed at the reactor surface.

18. A surface reactor as claimed in claim 12, wherein at each entry location the respective reactant is fed in the form of a thin film of thickness between 5 and 500 micrometers.

19. A surface reactor as claimed in claim 12, wherein the reactor comprises means whereby the thickness dimension of the reaction passage can be varied, and the thickness dimension is less than 1.00 mm (0.04 in).

20. A surface reactor as claimed in claim 12, wherein the means feeding each thin film after the first thin film to the reactor surface is fed vertically to the reactor surface into the first thin film or combination of thin films that precedes it.

* * * * *